United States Patent [19]

Ryu

[11] Patent Number: 4,635,964
[45] Date of Patent: Jan. 13, 1987

[54] SEATBELT ASSEMBLY

[75] Inventor: Nobuyuki Ryu, Toyota, Japan

[73] Assignee: Toyota Jidosha Kabushiki Kaisha, Japan

[21] Appl. No.: 739,174

[22] Filed: May 30, 1985

[30] Foreign Application Priority Data

Sep. 28, 1984 [JP] Japan .................. 59-146741[U]

[51] Int. Cl.$^4$ .............................................. B60R 21/00
[52] U.S. Cl. .................................................... 280/804
[58] Field of Search ................ 280/802, 804, 807; 297/469, 473

[56] References Cited

U.S. PATENT DOCUMENTS

| 4,343,489 | 8/1982 | Suzuki et al. | 280/804 |
| 4,437,684 | 3/1984 | Moriya et al. | 280/804 |
| 4,498,690 | 2/1985 | Takada | 280/804 |
| 4,560,187 | 12/1985 | Yoshitsugu | 280/804 |

Primary Examiner—Richard A. Bertsch
Attorney, Agent, or Firm—Parkhurst & Oliff

[57] ABSTRACT

The present invention relates to an automatically fastening seatbelt assembly which causes an occupant of a vehicle to be automatically held to a seat in the vehicle by a restraining webbing, after the occupant is positioned on the seat in the vehicle. The seatbelt assembly includes a guide rail, a slider which is displaceable along the guide rail and a restraining webbing which is fixed to the slider at one end thereof. This guide rail is provided with stop switches at each end thereof. The stop switches are connected to a source of electricity or an electric control circuit through connecting wires. Further, the stop switches detect the arrival of the slider at either end of the guide rail and output signals to the electric control circuit. More particularly, the present invention relates to improvements in the guide rail assembly which protects the connecting wires which are connected to the stop switches. Specifically, the connecting wires are located within a longitudinally extending wire receiving recess along the guide rail, which protects the connecting wires by maintaining them within the recess.

23 Claims, 7 Drawing Figures

SEATBELT ASSEMBLY

BACKGROUND OF THE INVENTION

The present invention relates to an automatically fastening seatbelt assembly which causes an occupant of a vehicle to be automatically held to a seat in the vehicle by a restraining webbing, after the occupant is positioned on the seat in the vehicle. The seatbelt assembly includes a guide rail, a slider which is displaceable along the guide rail and a restraining webbing which is fixed to the slider at one end thereof. This guide rail is provided with stop switches at each end thereof. The stop switches are connected to a source of electricity or an electric control circuit through connecting wire. Further, the stop switches detect the arrival of the slider at either end of the guide rail and output signals to the electric control circuit. However, known seatbelt assemblies have suffered from problems associated with installation of the connecting wires on the guide rail, such that the connecting wires kink or twine together during assembly of the seatbelt assembly to the vehicle body, resulting in increased production time and increasing production costs.

A similar seatbelt assembly is disclosed in U.S. Pat. No. 4,343,489. This patent discloses a seatbelt assembly which includes a guide rail having a longitudinal guide groove therein. The guide rail is fixed on a roof side member of a vehicle and a slider, which slides in the guide groove, is displaceable along the guide rail. Further, the slider is connected to one end of a restraining webbing by an anchor plate The guide rail is provided with a forward stop switch provided at a forward portion of the guide rail and a rearward stop switch provided at a rearward portion of the guide rail. The forward and rearward stop switches are connected to a source of electricity or an electric control circuit by connecting wires. The connecting wires supply current to the foreward and rearward stop switches, which in turn can supply an output signal to the electric control circuit. When an occupant sits on the front seat in the vehicle and the door of the vehicle is closed, the slider moves from a forward location to a rearward location as it is displaced along the guide groove. This movement of the slider results in the restraining webbing moving, causing the occupant to be automatically restrained in the seat by the restraining webbing.

When the slider approaches the rearward stop switch on the guide rail, the slider contacts an actuator on the rearward stop switch, thereby stopping any further rearward displacement of the slider. Conversely, when the occupant opens the door of the vehicle, the slider moves from its rearward location, along the groove, to a forward location causing the restraining webbing to move away from the occupant toward the front of the vehicle. When the slider approaches the forward stop switch, the slider contacts an actuator on the forward stop switch, thereby stopping any further forward displacement of the slider. Thus, the occupant may exit the vehicle. This seatbelt system makes it very convenient for an occupant to be fastened in by a seatbelt.

However, the seatbelt assembly is very difficult to install in a vehicle. Specifically, it is particularly troublesome to install the guide rail and the connecting wires of the forward and rearward stop switches on the roof side member. The difficulty arises because the connecting wires often twist around the guide rail and frequently become tangled together when they are installed on the roof side member. U.S. application Ser. No 712,607, filed Mar. 18, 1985, pending which is herein incorporated by reference, is contemporaneous with this application and discloses a fastening means for fastening the connecting wires to the guide rail prior to installing the guide rail on the vehicle. Such fastening means enable a worker to install the seatbelt assembly in a shorter amount of time because of the decreased amount of difficulty in handling the assembly. Further, U.S. application Ser. No. 717,870, filed Mar. 29, 1985 now U.S. Pat. No. 4,618,164, which is herein incorporated by reference, is also contemporaneous with this application and discloses a connecting wire guide bracket located adjacent to the stop switches. The guide bracket prevents kinking of the connecting wires near the stop switches. The present invention provides an alternative assembly for maintaining the connecting wires in the guide rail assembly.

SUMMARY OF THE INVENTION

The present invention has been developed in view of the foregoing background and to overcome the foregoing drawbacks. It is accordingly an object of this invention to provide a guide rail assembly which contains protectively, connecting wires therein. The connecting wires carry electric current to/from stop switches positioned at forward and rearward ends of a guide rail. The connecting wires are disposed within a longitudinal wire receiving groove which runs along the length of the guide rail. The guide rail has a second longitudinal groove therein. The second longitudinal groove is a guide groove, along which a slider is longitudinally displaced. The slider is attached to a restraining webbing which functions as an automatic seatbelt. The longitudinal wire receiving groove permits the connecting wires to be placed therein, prior to assembling the guide rail on the body of a vehicle. Therefore, the inclusion of the longitudinal wire recieving groove along the guide rail protects the connecting wires during installation of the guide rail assembly. Furthermore, because the connecting wires are predisposed along the longitudinal wire receiving groove, a factory worker does not have to devote any substantial amount of time to making sure that the connecting wires are correctly positioned along the guide rail. Thus, this assembly provides for increased productivity by decreasing assembly time.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate different embodiments according to the present invention.

Figure 1:
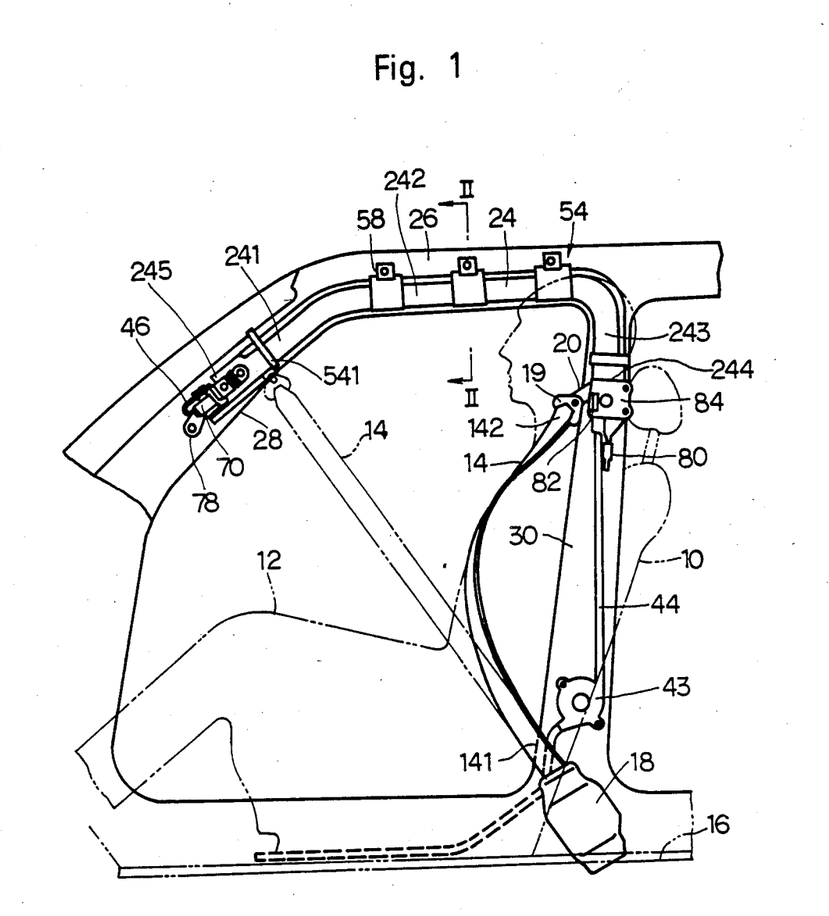
FIG. 1 is a side view of a seatbelt system according to the present invention installed on a passenger side of a vehicle, as viewed from the driver side of the vehicle.

Referring to FIG. 1, a restraining webbing 14 is designed such that it extends and surrounds the body of an occupant 12, when the occupant is positioned upon the seat 10. Further, when the vehicle door (not shown in drawings) is opened, the location of the restraining webbing 14 is represented by the broken line. A retractor 18 winds a portion 141 of the webbing 14 therein. The retractor 18 is secured to a floor member 16 of a vehicle. The retractor 18 is located at a substantially central portion in the lateral direction of the vehicle. The retractor 18 utilizes a locking mechanism which prevents an abrupt windoff of the webbing 14 in an emergency situation.

Figure 2:
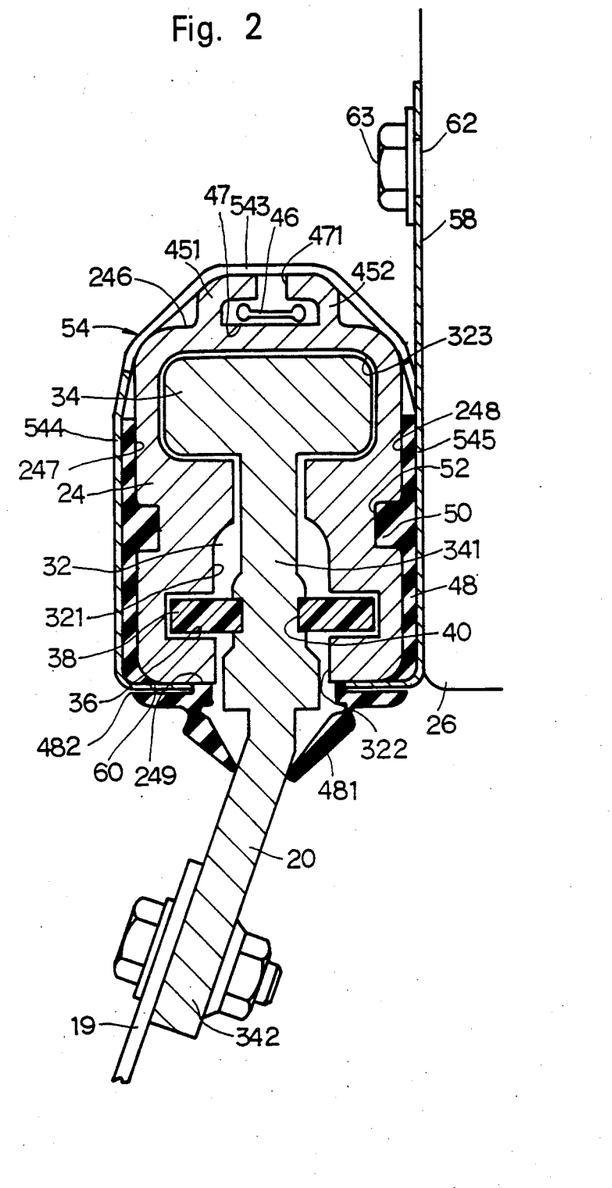
FIG. 2 is an enlarged cross-sectional view of taken along the line II—II in FIG. 1, wherein a slider is disposed on the line II—II in FIG. 1.

An outer portion 142 of the webbing 14 is connected to a slider 20 by an anchor plate 19. As shown in FIG. 2, the slider 20 is located within a guide groove 32 defined within a guide rail 24. The guide rail 24 is fixed on a front pillar 28, a roof side member 26 and a center pillar 30 of the vehicle. A slanted front portion 241 of the guide rail 24 is secured to the front pillar 28. A horizontal central portion 242 of the guide rail 24 is secured to the roof side member 26. A vertical rear portion 243 of the guide rail 24 is secured to the center pillar 30. Further, the guide groove 32 extends in a longitudinal direction along the guide rail 24, and the slider 20 is longitudinally displaceable along the guide groove 32.

As shown in FIG. 2, the slider 20 includes a head portion 34 and a body portion 341, such that the slider 20 is substantially T-shaped in cross-section. The body portion 341 includes a leg portion 342 at a lower end thereof. The head portion 34 is slidably received in a head groove 323. The body portion 341 includes an installing hole 40, which receives a driving tape 38. The driving tape 38 and the body portion 341 are displaceable throughout a guiding slit 322 which extends along the longitudinal direction of the guide rail 24. The driving tape 38 is displaceable within a tape groove 36, and the driving tape 38 perpendicularly intersects an intermediate portion 321 of the guide groove 32. The tape groove 36 also extends along the longitudinal direction of the guide rail 24. More specifically, the driving tape 38 is displaceable along the tape groove 36 such that the slider 20 can move between a forward portion 245 and a rearward portion 244 of the guide rail 24.

The anchor plate 19 is rotatably connected to a lower end of the leg portion of the slider 20 by a bolt and a nut assembly.

The guide rail 24 includes mounting grooves 52 which are longitudinally provided along the guide rail 24. The mounting grooves 52 can be continuously or intermittently formed in both side surfaces 247 and 248 of the guide rail 24. A cover 48 is provided with lips 481 which conceal the guiding slit 322 of the guide groove 32 to improve the aesthetic appearance of the assembly. Further, projections 50 of the cover 48 are received and held within the mounting grooves 52.

Figure 3:
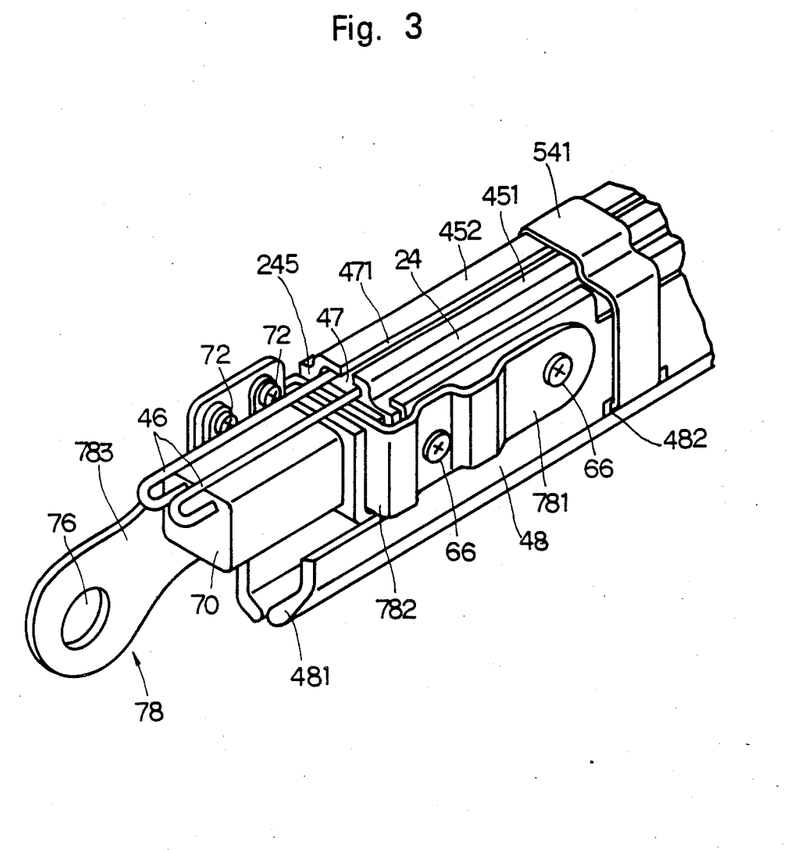
FIG. 3 is an enlarged perspective view of a stop switch assembly, which comprises a forward end portion of the guide rail shown generally in FIG. 1.
Figure 4:
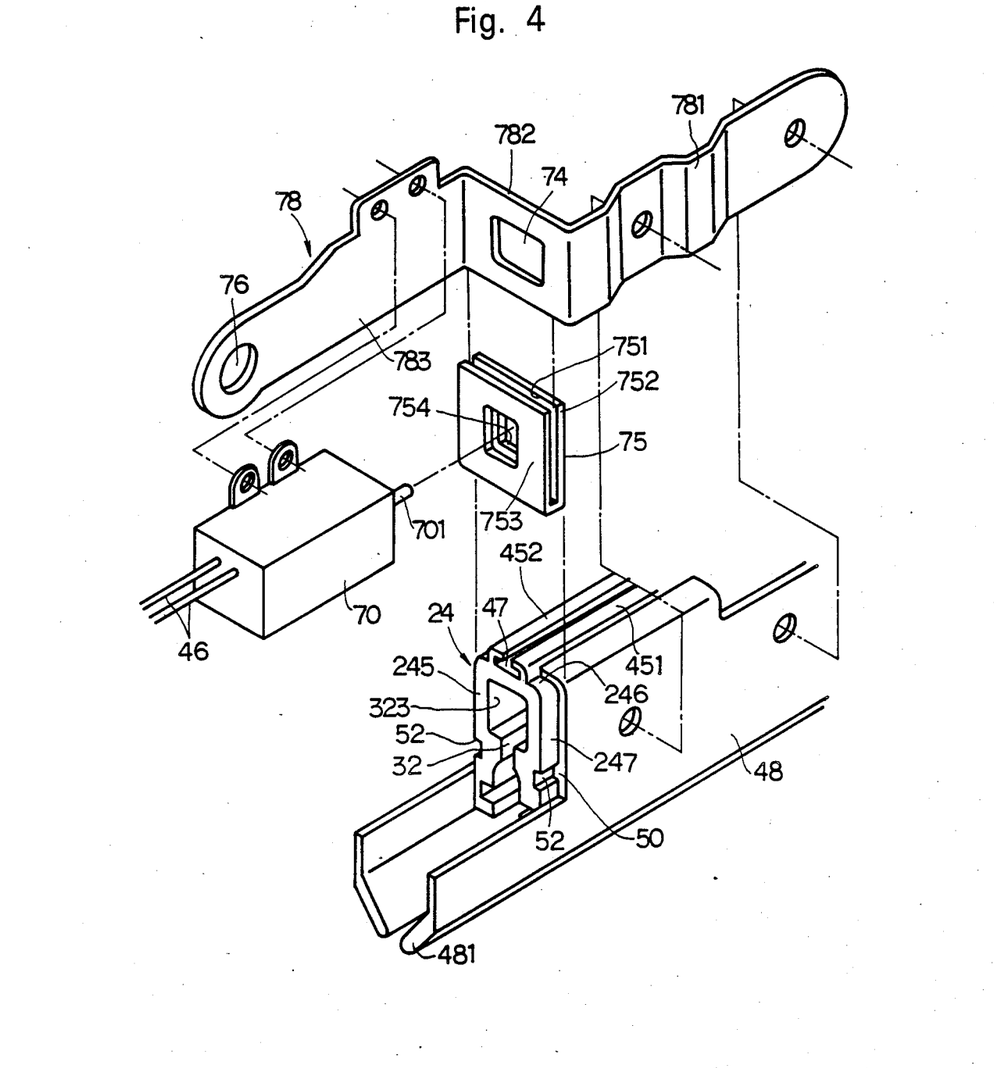
FIG. 4 is a perspective disassembled view of the embodiment shown in FIG. 3.

As shown in FIG. 1, a forward stop switch 70 is located on the front end 245 of the guide rail 24. The forward end 245 of the guide rail 24 is fixed to the vehicle body by a forward anchor bracket 78. A rearward stop switch 82 is located on the rearward end 244 of the guide rail 24. The rearward end 244 of the guide rail 24 is fixed to the vehicle body by a rearward anchor bracket 84. As shown in FIG. 3 and FIG. 4, actuators 701 of the forward stop switch 70 and the rearward stop switch 82 are located within the guide groove 32 such that they can be actuated by contacting the head portion 34 of the slider 20. When the head portion 34 of the slider 20 contacts the actuators 701, the slider 20 will not be displaced any further.

More specifically, the forward stop switch 70 is fixed to a first anchor portion 783 of the forward anchor bracket 78 by bolts 72. The first anchor portion 783 has a hole 76 therethrough for inserting a bolt therein. The forward anchor bracket 78 further includes an intermediate portion 782 and a second anchor portion 781. The intermediate portion 782 extends substantially perpendicular from the rearward end of the first anchor portion 783, corresponding to a lateral direction in the vehicle. The intermediate portion 782 has an opening 74 therein, which accommodate the actuator 701 of the forward stop switch 70. The second anchor portion 781 extends substantially perpendicular from the intermediate portion 782 such that it substantially parallels the first anchor portion 783 along the longitudinal direction in the vehicle. The second anchor portion 781 is fixed to a side surface 247 of the guide rail 24 by bolts 66, with a cover 48 for the guide rail 24 being between the guide rail 24 and the second anchor portion 781. The intermediate portion 782 of the forward anchor bracket 78 is positioned within a damper 75. Specifically, the damper 75 is U-shaped in cross section, thereby creating a slit therein, whereby the intermediate portion 782 is inserted in the slit.

The U-shaped damper 75, which has an opening 751 for holding the intermediate portion 782 therein, includes a first sheet 752 and a second sheet 753. When the forward stop switch 70 is assembled, as shown in FIG. 3, the first sheet 752 is positioned between a forward end 245 of the guide rail 24 and the intermediate portion 782 of the forward anchor bracket 78. Further, the second sheet 753 is positioned between the intermediate portion 782 of the forward anchor bracket 78 and the forward stop switch 70. The first sheet 752 and the second sheet 753 include apertures 754 therein. The apertures 754 of the damper 75 coincide with the opening 74 in the intermediate portion 782 of the forward anchor bracket 78. Further, the apertures 754 communicate with the head groove 323 of the guide groove 32. The acutator 701 of the forward stop switch 70 protrudes through the apertures 754 of the damper 75 and the opening 74 of the first anchor bracket 78 and into the head groove 323 of the guide rail 24.

The forward stop switch 70 is connected to a source of electricity (not shown in the drawings) or an electric control circuit (not shown in the drawings) by at least one connecting wire 46. One end of the connecting wire 46 is connected to the forward stop switch 70 and a second end is connected to the source of electricity or the electric control circuit. An intermediate portion of the connecting wires 46 is located within a longitudinally located wire receiving groove 47 in the guide rail 24. The wire receiving groove 47 is formed on a top surface 246 of the guide rail 24. The wire receiving groove 47 comprises a first L-shaped flange 451 and a second L-shaped flange 452, both flanges extending longitudinally along the guide rail 24. A lateral distance is provided between the first flange 451 and the second flange 452. The lateral distance between the first flange 451 and the second flange 452 corresponds to the width of the wire receiving groove 47. This width is arranged such that it is wider than twice the diameter of a connecting wire 46.

As shown in FIG. 2, the first flange 451 extends upwardly from the top surface 246 of the guide rail 24 and is bent at a substantially right angle such that it is L-shaped. Further, the second flange 452 extends upwardly from the top surface 246 of the guide rail 24 and is also bent at a substantially right angle and is also L-shaped, the bent portions of each flange point substantially toward each other. Thus, the wire receiving groove 47 is defined between the flange 451, the second flange 452 and the top surface 246 of the guide rail 24. A lateral opening or slit 471 is provided between each of the bent portions, the slit 471 being narrower than the width of the wire receiving groove 47. However, the width of the slit 471 is greater than the diameter of one of the connecting wires 46, such that the connecting wire 46 can be inserted through the slit 471 and into the wire receiving groove 47.

Figure 5:
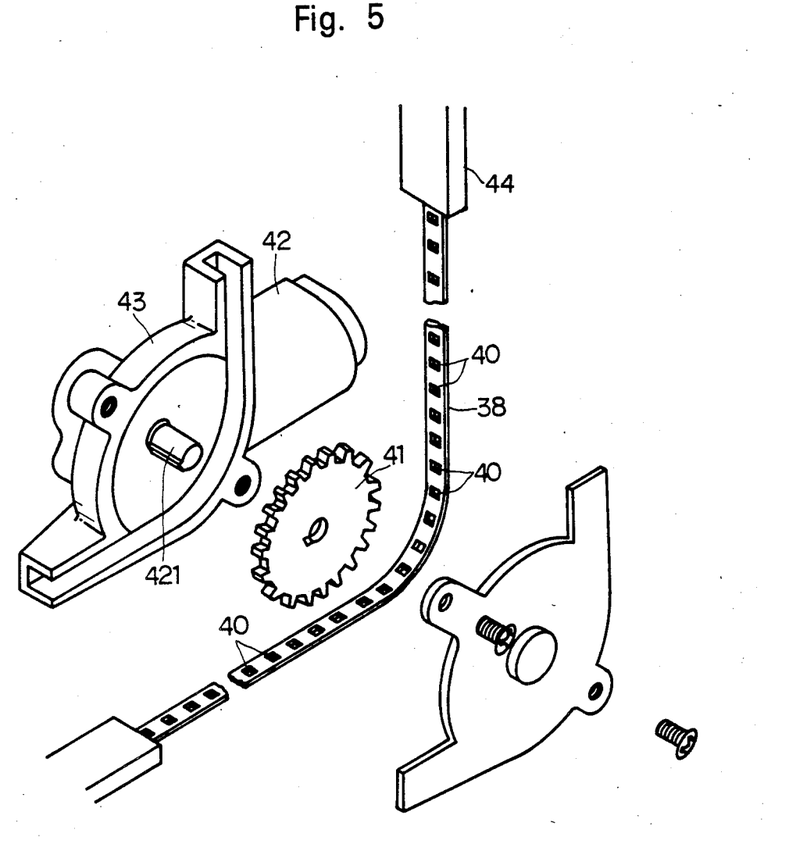
FIG. 5 is an enlarged perspective view showing components of a driving means in a disassembled condition for driving a tape which is connected to the slider at an end thereof.

Furthermore, as shown in FIG. 1, the rearward end 244 of the guide rail 24 is connected to a tape track 44, which includes a tape groove therein (not shown in the drawings). This tape groove communicates with the tape groove 36 of the guide rail 24. A lower end of the tape track 44 is in contact with a sprocket housing 43 which is secured to a lower portion of the center pillar 30. A shown in FIG. 5, rectangular openings 40 of the driving tap 38 mesh with a sprocket wheel 41, which is pivotally supported in the sprocket housing 43. The sprocket wheel 41 is adapted to be rotated by an output shaft 421 of a motor 42, and when the sprocket wheel 41 rotates, it drives the driving tape 38 such that it moves along the tape track 44 and the guide rail 24. The movements of the driving tape 38 causes the slider 20 to move between forward and rearward ends of the guide rail 24.

The motor 42 displaces the driving tape 38 whenever an occupant enters the vehicle or prepares to exit the vehicle. For example, when an occupant sits on the seat 10 of the vehicle and closes the door, the sprocket wheel 41 turns in a clockwise direction (with respect to Figure 5), whereby the slider 20 is displaced from the forward end 245 of the guide rail 24 toward the rearward end 244. The slider 20 stops when it reaches the rearward stop switch 82. Conversely, when an occupant opens the door, the sprocket wheel 41 turns in a counter-clockwise direction, whereby the slider 20 is displaced from the rearward end 244 of the guide rail 24 toward the forward end 245.

Figure 6:
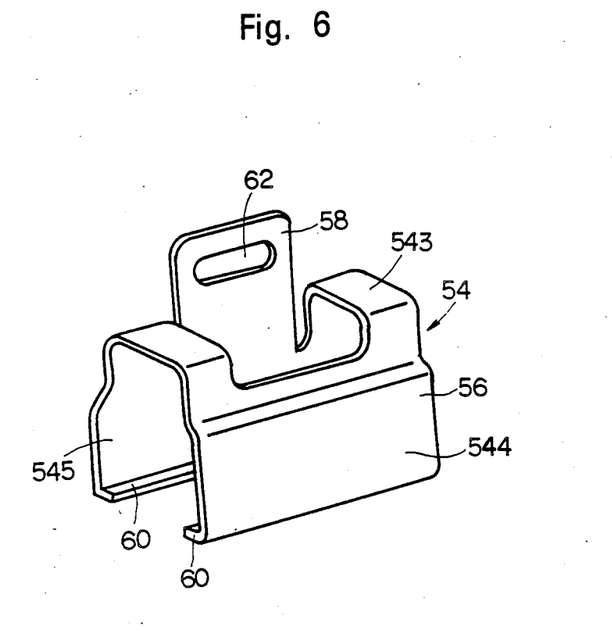
FIG. 6 is an enlarged perspective view showing a fastening means for fastening the guide rail to the vehicle body.

An embodiment of a hanger which fixes the guide rail 24 to the vehicle body is shown FIG. 6. The hanger 54 includes a holding portion 56 and a mounting flange 58. The holding portion 56 holds or supports the guide rail 24. The holding portion 56 includes a top horizontal plate 543, an inner vertical plate 544 and an outer vertical plate 545. The inner vertical plate 544 extends downwardly from an inner edge of the top horizontal plate 543, while the outer vertical plate 545 extends downwardly from an outer edge of the top horizontal plate 543. The vertical plate 544 and 545 and spaced laterally apart. Further, two bent portions 60 extend horizontally toward each other from respective lower ends of each vertical plate 544 and 545. As shown in FIG. 2, the bent portions 60 are inserted into apertures 482 of the cover 48. The bent portion 60 are in contact with the bottom surface 249 of the guide rail 24. The covers 48 are positioned between the first side surface 247 of the guide rail 24 and the inner vertical plate 544 of the hanger 54, and between the second side surface 248 of the guide rail 24 and the outer vertical plate 545 of the hanger 54. The mounting flange 58 upwardly extends from the outer vertical plate 545. The mounting flange 58 is provided with a hole 62 for inserting a mounting bolt 63 therethrough.

As shown in FIG. 3, the cover 48 is in contact with a fastener 541 and both ends of the fastener 541 are inserted into the apertures 482, which are provided on the cover 48. The fastener 541 contacts upper surfaces of the bent portions of the L-shaped flanges 451 and 452 and horizontally crosses over the slit 471. Thus, the fastener 541 covers a portion of the slit 471 and prevents the connecting wires 46 from slipping out of the wire receiving groove 47 through the slit 471.

For a detailed discussion of how the automatic seatbelt assembly actually operates, see U.S. Pat. No. 4,323,489, which is herein incorporated by reference.

To install the guide rail assembly 24 on the roof side member 26, a worker simply secures the hangers 54 to the roof side member 26 and forward anchor bracket 78 to the forward pillar 28 and rearward anchor bracket 84 to the center pillar 30 by appropriately securing a plurality of bolts 63. The prior attachment of the connecting wires 46 in the wire receiving groove 47 permits an installer of the guide rail assembly to pay very little attention to the position of the connecting wires 46 because they are protected within the confines of the wire receiving groove 47.

Figure 7:
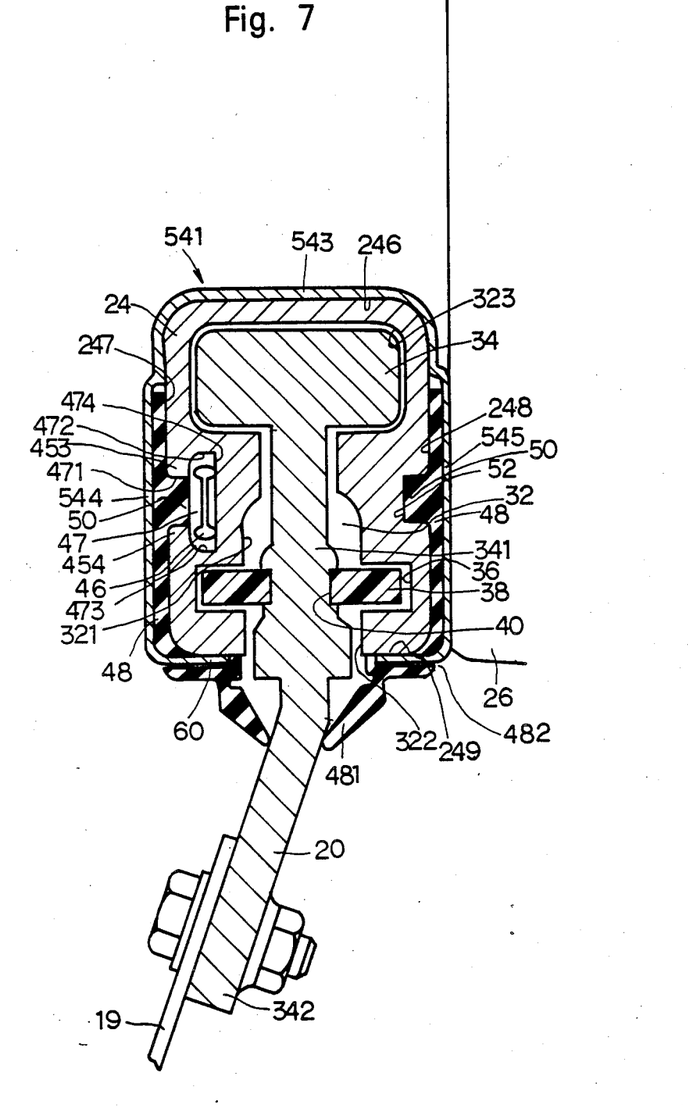
FIG. 7 is an enlarged cross-sectional view of a second embodiment taken along the line II—II in FIG. 4.

FIG. 7 discloses a second embodiment of a guide rail assembly according to the present invention. Most of the components shown in FIG. 7 are similar to the components disclosed in FIG. 2. However, the differences between the first and second embodiments shall be discussed.

FIG. 7 shows that the wire receiving groove 47 is positioned upon a side surface 247 of the guide rail 24, rather than the top surface 246. The wire receiving groove 47 is defined within the side surface 247 by a first projection 453 and a second projection 454. The first projection 453 extends downwardly from a first inner surface 472 and the second projection 454 extends upwardly from a second inner surface 473. The inner surfaces 472 and 473 define the width of the wire receiving groove 47, the width being at least twice as wide as the diameter of one of the connecting wires 46. A slit 471 is defined between a lower portion of the first projection 453 and an upper portion of the second projection 454. The slit 471 is narrower than the wire recieving groove 47, but wider than the diameter of one connecting wire 46. Thus, the connecting wires 46 can be inserted into the wire receiving groove 47 by passing through the slit 471. A projection 50 of the cover 48 can then be inserted into the slit 471 such that the cover 48 and the projection 50 conceal or block-off the slit 471 and the wire receiving recess 47.

As disclosed herein, the present invention provides a means for holding the kinking of connecting wires, which are attached to forward and rearward stop switch assemblies, by proving a novel apparatus for locating the connecting wires within a guide rail of an automatically fastening seatbelt assembly. Thus, the present invention is a significant contribution to the art because a seatbelt assembly can be installed by a worker in a shorter amount of time, thereby reducing production time and production costs.

Further, it should also be apparent that the present invention has been described in its preferred embodiments, but should not be limited thereto, and may be otherwise embodied within the scope of the following claims.

What is claimed is:

1. A seatbelt assembly for automatically fastening a restraining webbing around an occupant in a vehicle, comprising:
a guide rail having a first and a second end, a longitudinal guide groove running between said first and second ends, an longitudinal wire receiving groove located on said guide rail and a separating wall physically separating the longitudinal guide groove from the longitudinal wire receiving groove thereby preventing the longitudinal guide groove from communicating with the longitudinal wire receiving groove;
a slider which is displaceable along said longitudinal guide groove, said restraining webbing being fastened at one end thereof to said slider;
a detecting means for detecting arrival of the slider at said first end of said guide rail; and
a connecting wire connected to said detecting means, the connecting wire being located within the longitudinal wire receiving groove, whereby said connecting wire is protected by said longitudinal wire receiving groove.

2. The seatbelt assembly of claim 1, wherein said guide rail is substantially rectangular-shaped, the guide rail having a top surface, a first side surface extending downwardly from an inner edge of the top surface, a second side surface extending downwardly from an outer edge of the top surface, and a bottom surface formed between lower edges of the first and second side surfaces, said top surface being part of said separating wall.

3. The seatbelt assembly of claim 2, wherein said longitudinal wire receiving groove is located upon said top surface of the guide rail.

4. The seatbelt assembly of claim 3, wherein said wire receiving groove is defined between first and second flanges which project upwardly from the top surface of the guide rail.

5. The seatbelt assembly of claim 4, wherein said first and second flanges are laterally spaced apart upon said top surface of the guide rail, the first and second flanges in conjunction with the top surface of the guide rail forming said longitudinal wire receiving groove.

6. The seatbelt assembly of claim 5, wherein said first and second flanges are bent, such that the flanges are substantially L-shaped and protrude from said top surface of the guide rail, such that said bent portions point substantially toward each other and are substantially parallel with said top surface of the guide rail.

7. The seatbelt assembly of claim 6, wherein said bent portions of said first and second upwardly projecting L-shaped flanges define a slit portion therebetween, whereby said slit portion is wider than a diameter of said connecting wire.

8. The seatbelt assembly of claim 7, wherein said slit between said bent portion of the first and second L-shaped flanges is laterally narrower in width than said longitudinal wire receiving groove.

9. The seatbelt assembly of claim 8, wherein a fastener is provided upon said guide rail such that the fastener covers a portion of the slit existing between said bent portion of the L-shaped flanges and prevents the connecting wires from slipping out of the wire receiving groove.

10. The seatbelt assembly of claim 2, wherein said longitudinal wire receiving groove is located in said first side surface of said guide rail.

11. The seatbelt assembly of claim 10, wherein said longitudinal wire receiving groove is defined within the first side surface of the guide rail by a first projection which extends downwardly from a first inner surface of the guide rail and a second projection which extends upwardly from a second inner surface of the guide rail, the first and second inner surfaces defining the width ofthe wire receiving groove.

12. The seatbelt assembly of claim 11, wherein said first projection and said second projection have a slit therebetween, said slit being wider than a diameter of the connecting wire.

13. The seatbelt assembly of claim 12, wherein said slit defined between said first and second projections is narrower than a width of said longitudinal wire receiving groove, which is defined between said first and second inner surfaces within said inner side surface of the guide rail.

14. The seatbelt assembly of claim 13, wherein a cover is placed over said guide rail, such that the longitudinal wire receiving recess is concealed by said cover.

15. A seatbelt assembly of claim 14, wherein said cover further comprises a protrusion which extends into said slit.

16. A seatbelt assembly for automatically fastening a restraining webbing around an occupant in a vehicle, comprising:
a guide rail having a first and a second end, a longitudinal guide groove running between said first and second ends, a separating wall and a longitudinal wire receiving groove, said longitudinal wire receiving groove being located on a top surface of said separating wall, said separating wall physically separating the longitudinal guide groove from the longitudinal wire receiving groove, whereby the longitudinal guide groove does not communicate with the longitudinal wire receiving groove;
a slider which is displaceable along said longitudinal guide groove, said restraining webbing being fastened at one end thereof to said slider;
a detecting means for detecting arrival of the slider at said first end of said guide rail; and
a connecting wire connected to said detecting means, the connecting wire being located within the longitudinal wire receiving groove, whereby said connecting wire is protected by said longitudinal wire receiving groove.

17. The seatbelt assembly of claim 16, wherein a hanger is secured to said guide rail and said hanger secures the guide rail to the vehicle.

18. The seatbelt assembly of claim 17, wherein said longitudinal wire receiving groove is defined between a first L-shaped flange which upwardly projects from said top surface of the separating wall and a second L-shaped flange which upwardly projects from said top surface of the separating wall, such that bent portions of each L-shaped flange point substantially toward each other.

19. A seatbelt assembly for automatically fastening a restraining webbing around an occupant in a vehicle, comprising:
   a guide rail having a first and a second end, a longitudinal guide groove running between said first and second ends, a separating wall and a longitudinal wire receiving groove located within a side portion of said guide rail, said separating wall physically separating the longitudinal guide groove from the longitudinal wire receiving groove such that the longitudinal guide groove is not in communication with the longitudinal wire receiving groove;
   a slider which is displaceable along said longitudinal guide groove, said restraining webbing being fastened at one end thereof to said slider;
   a detecting means for detecting arrival of the slider at said first end of said guide rail; and
   a connecting wire connected to said detecting means, the connecting wire being located within the longitudinal wire receiving groove, whereby said connecting wire is protected by said longitudinal wire receiving groove.

20. The seat belt assembly of claim 19, wherein a slit, which is narrower in width than said longitudinal wire receiving groove, is located in said side portion of the guide rail which contains said longitudinal wire receiving groove and communicates therewith.

21. The seatbelt assembly of claim 20, wherein said slit is on a first side surface of the guide rail, said first side surface also being said side surface of said separating wall.

22. The seat belt assembly of claim 21, wherein a cover is placed upon said guide rail, such that the cover substantially conceals said slit which communicates with the wire receiving groove.

23. A seatbelt assembly of claim 22, wherein said cover has a projection which is inserted into said slit.

* * * * *